| (12) | United States Patent | (10) Patent No.: | US 9,097,165 B2 |
|---|---|---|---|
| | Kim | (45) Date of Patent: | Aug. 4, 2015 |

(54) VEHICLE HAVING SYSTEM AND METHOD OF DIAGNOSING SECONDARY AIR INJECTION APPARATUS

(71) Applicants: Hyundai Motor Company, Seoul (KR); Kia Motors Corporation, Seoul (KR)

(72) Inventor: Seungbum Kim, Seongnam-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 43 days.

(21) Appl. No.: 13/709,917

(22) Filed: Dec. 10, 2012

(65) Prior Publication Data

US 2014/0020367 A1    Jan. 23, 2014

(30) Foreign Application Priority Data

Jul. 20, 2012    (KR) .................. 10-2012-0079403

(51) Int. Cl.
*F01N 3/10* (2006.01)
*F01N 11/00* (2006.01)
*F02B 37/16* (2006.01)
*F01N 3/20* (2006.01)
*F01N 3/22* (2006.01)

(52) U.S. Cl.
CPC .............. *F01N 11/00* (2013.01); *F01N 11/007* (2013.01); *F02B 37/168* (2013.01); *F01N 3/2006* (2013.01); *F01N 3/22* (2013.01); *F01N 2550/14* (2013.01); *F01N 2900/08* (2013.01); *F01N 2900/1602* (2013.01); *F01N 2900/1804* (2013.01); *Y02T 10/144* (2013.01); *Y02T 10/47* (2013.01)

(58) Field of Classification Search
CPC ............. F01N 3/22; F01N 3/32; F01N 3/222; F01N 3/02; F01N 3/034; F01N 3/26; F01N 3/30
USPC ........................... 60/273, 274, 289, 304, 307
See application file for complete search history.

(56) References Cited

U.S. PATENT DOCUMENTS

| 5,333,446 A | * | 8/1994 | Itoh ................................. 60/274 |
| 5,381,658 A | * | 1/1995 | Meguro .......................... 60/276 |
| 5,782,086 A | * | 7/1998 | Kato et al. ...................... 60/274 |

(Continued)

FOREIGN PATENT DOCUMENTS

| EP | 1 722 089 A1 | 11/2006 | |
| JP | 2003138929 A | * 5/2003 | ................ F01N 3/20 |

(Continued)

*Primary Examiner* — Thomas Denion
*Assistant Examiner* — Patrick Maines
(74) *Attorney, Agent, or Firm* — Morgan, Lewis & Bockius LLP

(57) ABSTRACT

A system and a method of diagnosing a secondary air injection apparatus may include an intake line supplying air to an engine, an exhaust line exhausting exhaust gas, a secondary air injection (SAI) line branching off at a branch point of the intake line and being joined to the exhaust line at a joining point of the exhaust line, a first pressure sensor mounted at the intake line to detect pressure or amount of intake air flowing through the intake line, a catalytic converter, a first oxygen sensor mounted at the exhaust line, an SAI pump mounted at the SAI line and pumping the air flowing through the intake line to the SAI line, an SAI valve mounted at the SAI line and selectively communicating the SAI line with the exhaust line, and a control portion controlling the SAI pump and the SAI valve to perform catalyst heating.

20 Claims, 5 Drawing Sheets

(56) References Cited

U.S. PATENT DOCUMENTS

| | | | |
|---|---|---|---|
| 6,085,517 A * | 7/2000 | Bayerle et al. | 60/274 |
| 2002/0124552 A1* | 9/2002 | Takaku | 60/277 |
| 2004/0148926 A1* | 8/2004 | Morinaga et al. | 60/277 |
| 2004/0194446 A1* | 10/2004 | Hirooka | 60/277 |
| 2006/0191504 A1* | 8/2006 | Kobori | 123/184.55 |
| 2007/0113827 A1* | 5/2007 | Moriya et al. | 123/435 |
| 2010/0028167 A1* | 2/2010 | Kondou et al. | 417/212 |
| 2010/0192929 A1* | 8/2010 | Ishiwatari | 123/674 |
| 2011/0083423 A1* | 4/2011 | Kadowaki | 60/276 |
| 2012/0285142 A1* | 11/2012 | Shibata et al. | 60/274 |
| 2012/0285263 A1* | 11/2012 | Kado et al. | 73/861.351 |

FOREIGN PATENT DOCUMENTS

| | | |
|---|---|---|
| KR | 1998-055138 A | 9/1998 |
| WO | WO 95/05531 A1 | 2/1995 |

* cited by examiner

VEHICLE HAVING SYSTEM AND METHOD OF DIAGNOSING SECONDARY AIR INJECTION APPARATUS

CROSS-REFERENCE TO RELATED APPLICATION

The present application claims priority to Korean Patent Application No. 10-2012-0079403 filed on Jul. 20, 2012, the entire contents of which is incorporated herein for all purposes by this reference.

BACKGROUND OF THE INVENTION

1. Field of the Invention

The present invention relates to a vehicle having a system and a method of diagnosing a secondary air injection apparatus. More particularly, the present invention relates to a vehicle having a system and a method of diagnosing a secondary air injection apparatus that can diagnose fault of the secondary air injection (SAI) apparatus without mounting an additional flow meter for detecting the fault at lines.

2. Description of Related Art

Recently, various technologies for reducing exhaust have been researched so as to meet strict exhaust regulations and one of such the technologies is catalyst heating.

According to the catalyst heating, an idle rotation speed (idle RPM) is raised for activating a catalyst at initial starting if an engine is not started for more than a predetermined time. If the idle rotation speed is raised compared to an engine load, a temperature of an exhaust gas is raised and a temperature of the catalyst is also raised when a high-temperature exhaust gas flows through the catalyst. Therefore, activation of the catalyst may be quickly achieved and the exhaust may be reduced.

Secondary air injection (SAI) technology has been researched for the catalyst heating. According to the SAI technology, a portion of intake air is supplied to an exhaust manifold or an exhaust line so as to burn the exhaust gas exhausted from a combustion chamber again. If the exhaust gas is burnt again, a temperature of the exhaust gas rises and accordingly the temperature of the catalyst also rise.

An SAI apparatus will be described in further detail.

The SAI apparatus includes an intake line for supplying air to the engine, an exhaust line for exhausting the exhaust gas generated at the engine, and an SAI line for connecting the intake line with the exhaust line.

An air filter is mounted at the intake line and a catalytic converter is mounted at the exhaust line. One end of the SAI line is connected to the intake line located at a rear end of the air filter, and the other end of the SAI line is connected to the exhaust line located at a front end of the catalytic converter. In addition, an SAI valve is mounted at the SAI line so as to selectively supply the air in the intake line to the exhaust line. That is, the air in the intake line is supplied to the exhaust line through the SAI line such that the exhaust gas in the exhaust line is burnt again if the SAI valve is open.

In addition, an SAI pump is mounted at the SAI line. In order to supply the air to the exhaust line through the SAI line, a pressure of the SAI line is to be higher than that of the exhaust gas. Therefore, the SAI pump raises the pressure of the SAI line so as to supply the air to the exhaust line efficiently.

Meanwhile, a flow meter is to be mounted at the SAI line and detects a flow amount of the SAI so as to meet reliability and on-board diagnosis (OBD) regulations of the SAI apparatus. That is, fault such as stuck of the SAI valve can be diagnosed by detecting the flow amount of the SAI flowing into the SAI line.

If the flow meter is mounted at the SAI line, however, cost may increase and it may be difficult to design layout of the SAI line.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a vehicle having a system and a method of diagnosing a secondary air injection apparatus having advantages of diagnosing fault of the secondary air injection apparatus without mounting an additional flow meter for fault diagnosis at an SAI line.

In an aspect of the present invention, a vehicle having a system of diagnosing a secondary air injection apparatus, may include an engine generating power by burning air/fuel mixture; an intake line supplying air to the engine; an exhaust line exhausting exhaust gas produced at the engine to the exterior of the vehicle; a secondary air injection (SAI) line branching off at a branch point of the intake line and being joined to the exhaust line at a joining point of the exhaust line; a first pressure sensor mounted at the intake line and detecting pressure or amount of intake air flowing through the intake line; a catalytic converter mounted at the exhaust line and removing noxious material contained in the exhaust gas; a first oxygen sensor mounted at the exhaust line between the joining point and the catalytic converter and detecting air/fuel ratio in the exhaust line; an SAI pump mounted at the SAI line and pumping the air flowing through the intake line to the SAI line; an SAI valve mounted at the SAI line and selectively communicating the SAI line with the exhaust line; and a control portion controlling the SAI pump and the SAI valve so as to perform catalyst heating, wherein the control portion determines air/fuel ratio of secondary combustion in a state where secondary air injection (SAI) is executed by driving the SAI pump and opening the SAI valve, determines air/fuel ratio of a combustion chamber in a state where the SAI valve is closed after the catalyst heating is completed by driving the SAI pump and opening the SAI valve, and determines fault by comparing the air/fuel ratio of the secondary combustion or the air/fuel ratio of the combustion chamber with the air/fuel ratio of the exhaust line detected by the first oxygen sensor.

The control portion opens the SAI valve when a pressure of the SAI line is higher than or equal to a predetermined pressure.

The control portion stores a first fault code related to SAI valve stuck or SAI line leak when the air/fuel ratio of the secondary combustion is larger than the air/fuel ratio of the exhaust line.

The control portion stores a second fault code related to an error of modeling value for determining a flow amount of the SAI when the air/fuel ratio of the secondary combustion is smaller than the air/fuel ratio of the exhaust line.

The control portion stores a third fault code related to the SAI valve stuck when the air/fuel ratio of the combustion chamber is not equal to the air/fuel ratio of the exhaust line.

The control portion determines the air/fuel ratio of the secondary combustion using the pressure or the amount of the intake air detected by the first pressure sensor and a rotation speed of the SAI pump.

The control portion determines a pressure difference between a front end and a rear end of the SAI valve using the rotation speed of the SAI pump and an exhaust pressure according to a load.

Modeling value for determining a flow amount of the SAI according to the pressure difference between the front end and the rear end of the SAI valve is stored in the control portion.

The control portion determines the air/fuel ratio of the combustion chamber using the pressure or the amount of intake air detected by the first pressure sensor.

The control portion determines that the catalyst heating is completed when a temperature of the catalytic converter is higher than or equal to a predetermined temperature.

In another aspect of the present invention, a method of diagnosing a secondary air injection apparatus provided with a first pressure sensor mounted at an intake line which supplies air to an engine and detects a pressure or an amount of intake air, a first oxygen sensor mounted at an exhaust line which exhausts exhaust gas generated at the engine and detects air/fuel ratio of the exhaust line, a SAI line which supplies the air to the exhaust gas of the exhaust line for catalyst heating, and an SAI pump and an SAI valve mounted at the SAI line, may include driving the SAI pump when a catalyst heating condition is satisfied; opening the SAI valve; determining air/fuel ratio of secondary combustion; detecting the air/fuel ratio of the exhaust line using the first oxygen sensor; and determining fault of the secondary air injection apparatus by comparing the air/fuel ratio of the secondary combustion with the air/fuel ratio of the exhaust line.

The SAI valve is opened when a pressure of the SAI line is higher than or equal to a predetermined pressure.

The determining of the air/fuel ratio of the secondary combustion includes: detecting the amount of the intake air; determining fuel injection amount; determining pressure difference between a front end and a rear end of the SAI valve; determining a flow amount of SAI according to the pressure difference; and determining the air/fuel ratio of the secondary combustion using the amount of the intake air, the fuel injection amount, and the flow amount of the SAI.

The method may further include storing a first fault code related to SAI valve stuck or SAI line leak when the air/fuel ratio of the secondary combustion is larger than the air/fuel ratio of the exhaust line.

The method may further include storing a second fault code related to an error of modeling value for determining the flow amount of the SAI when the air/fuel ratio of the secondary combustion is smaller than the air/fuel ratio of the exhaust line.

In further another aspect of the present invention, a method of diagnosing a secondary air injection apparatus provided with a first pressure sensor mounted at an intake line which supplies air to an engine and detects a pressure or an amount of intake air, a first oxygen sensor mounted at an exhaust line which exhausts exhaust gas generated at the engine and detects air/fuel ratio of the exhaust line, a SAI line which supplies the intake air to the exhaust gas of the exhaust line for catalyst heating, and an SAI pump and an SAI valve mounted at the SAI line may include driving the SAI pump when a catalyst heating condition is satisfied; opening the SAI valve; determining whether the catalyst heating is completed; closing the SAI valve when the catalyst heating is completed, determining air/fuel ratio of a combustion chamber in the engine; detecting the air/fuel ratio of the exhaust line using the first oxygen sensor; and determining fault of the secondary air injection apparatus by comparing the air/fuel ratio of the combustion chamber with the air/fuel ratio of the exhaust line.

The SAI valve is opened when a pressure of the SAI line is higher than or equal to a predetermined pressure.

The determining of the air/fuel ratio of the combustion chamber includes: detecting the amount of the intake air; determining fuel injection amount; and determining the air/fuel ratio of the combustion chamber using the amount of the intake air and the fuel injection amount.

The method may further include storing a third fault code related to the SAI valve stuck when the air/fuel ratio of the combustion chamber is not equal to the air/fuel ratio of the exhaust line.

The SAI valve is opened when the pressure of the SAI line is higher than or equal to a predetermined pressure.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
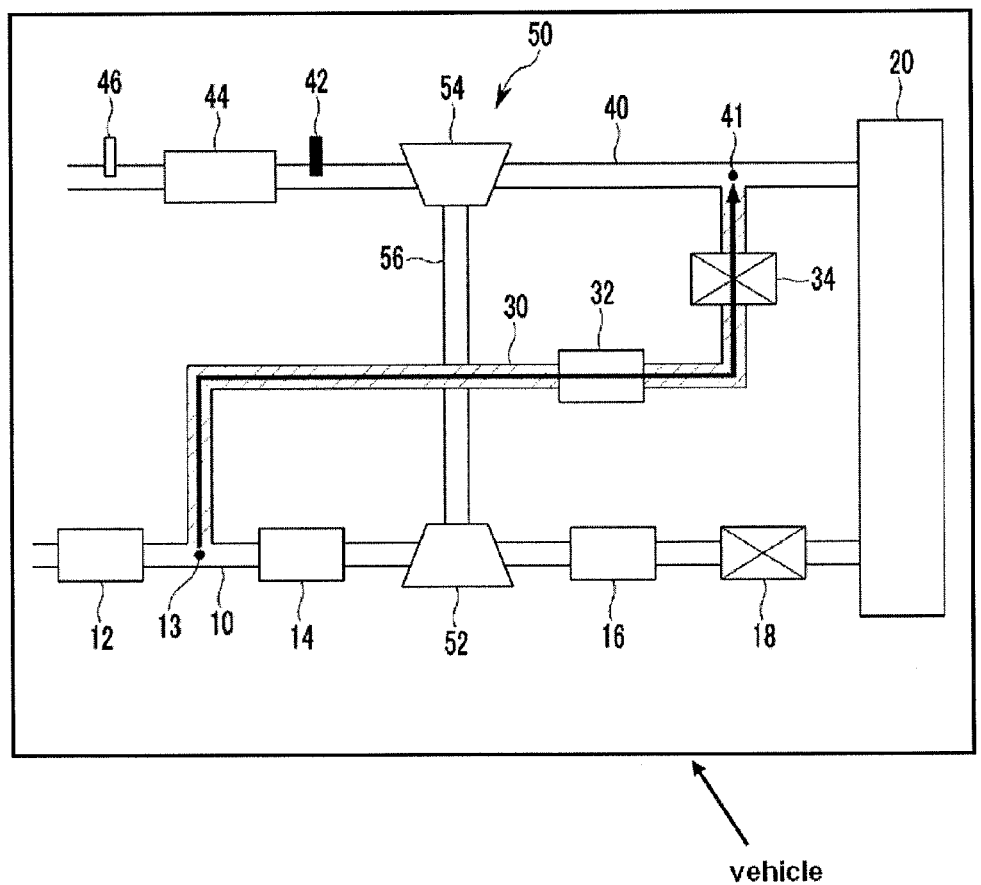
FIG. 1 is a schematic diagram of a secondary air injection apparatus according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

FIG. 1 is a schematic diagram of a secondary air injection apparatus according to an exemplary embodiment of the present invention.

As shown in FIG. 1, a secondary air injection apparatus according to an exemplary embodiment of the present invention includes an intake line 10, an engine 20, a secondary air injection (SAI) line 30, and an exhaust line 40.

The intake line 10 is used for supplying air to the engine 20 and an air filter 12, a first pressure sensor 14, a second pressure sensor 16, and a throttle valve 18 are mounted at the intake line 10.

The air filter 12 filters foreign material contained in the air flowing into the intake line 10.

The first pressure sensor 14 is mounted at the intake line 10 downstream of the air filter 12 and detects a pressure of the air flowing through the intake line 10. If using the pressure detected by the first pressure sensor 14, an amount of the air flowing through the intake line 10 can be calculated. That is, since modeling value for calculating the amount of the air according to the pressure of the air is stored, the amount of the air can be calculated using the pressure of the air. A first flow meter instead of the first pressure sensor 14 may be used.

The second pressure sensor 16 is mounted at the intake line 10 downstream of the first pressure sensor 14 and detects a pressure of an intake manifold.

The throttle valve 18 is mounted at the intake line 10 downstream of the second pressure sensor 16 and controls the amount of the air supplied to a combustion chamber of the engine 10.

The engine 20 generates power by burning the air supplied through the intake line 10 and fuel injected by an injector. The combustion chamber is formed at the engine 20 and a spark plug is mounted at the combustion chamber so as to burn air/fuel mixture supplied to the combustion chamber. Meanwhile, the injector may be mounted at the intake line 10 or the combustion chamber.

The SAI line 30 branches off at a branch point 13 positioned at the intake line 10 and joins the exhaust line 40. The branch point 13 is positioned downstream of the air filter 12. An SAI pump 32 and an SAI valve 34 are mounted at the SAI line 30, and the SAI line 30 is used for supplying a portion of the air flowing through the intake line 10 to the exhaust line 40.

The SAI pump 32 pumps the air flowing through the intake line 10 to the SAI line 30. In addition, the SAI pump 32 increases the pressure of the air flowing through the SAI line 30 so as to supply the air to the exhaust line 40 efficiently. The SAI pump 32 may be controlled by a pulse width modulation (PWM) signal.

The SAI valve 34 selectively communicates the SAI line 30 with the exhaust line 40. That is, the air flowing through the SAI line 30 is supplied to the exhaust line 40 so as to burn the exhaust gas again if the SAI valve 34 is open. On the contrary, the air flowing through the SAI line 30 is not supplied to the exhaust line 40 if the SAI valve 34 is closed.

The exhaust line 40 is used for exhausting the exhaust gas generated at the engine to the exterior of a vehicle. A first oxygen sensor 42, a catalytic converter 44, and a second oxygen sensor 46 are mounted at the exhaust line 40.

The first oxygen sensor 42 detects an air/fuel ratio of the exhaust line. Herein, the air/fuel ratio of the exhaust line means a ratio of oxygen and fuel contained in the exhaust gas exhausted from the engine 20. An operation of the engine 20 may be controlled according to the air/fuel ratio of the exhaust line detected by the first oxygen sensor 42.

The catalytic converter 44 is mounted at the exhaust line 40 downstream of the first oxygen sensor 42. The catalytic converter 44 is adapted to remove noxious material contained in the exhaust gas. The catalytic converter 44 may be but not be limited to a three way catalytic converter.

The second oxygen sensor 46 is mounted at the exhaust line 40 downstream of the catalytic converter 44. The second oxygen sensor 46 detects the air/fuel ratio of the exhaust gas passing the catalytic converter 44. Therefore, it is determined whether the catalytic converter 44 operates normally based on the detected value of the second oxygen sensor 46.

Meanwhile, a turbo charger 50 is mounted between the intake line 10 and the exhaust line 40. The turbo charger 50 increases the amount of the intake air using energy of the exhaust gas. The turbo charger 50 includes a compressor 52 mounted at the intake line 10, a turbine 54 mounted at the exhaust line 40, and a connecting shaft 56 connecting the compressor 52 and the turbine 54.

In addition, a joining point 41 is positioned at the exhaust line 40 upstream of the turbine 54 and the SAI line 30 and the exhaust line 40 are joined together at the joining point 41. The SAI valve 34 is mounted at the SAI line 30 near the joining point 41.

Figure 2:
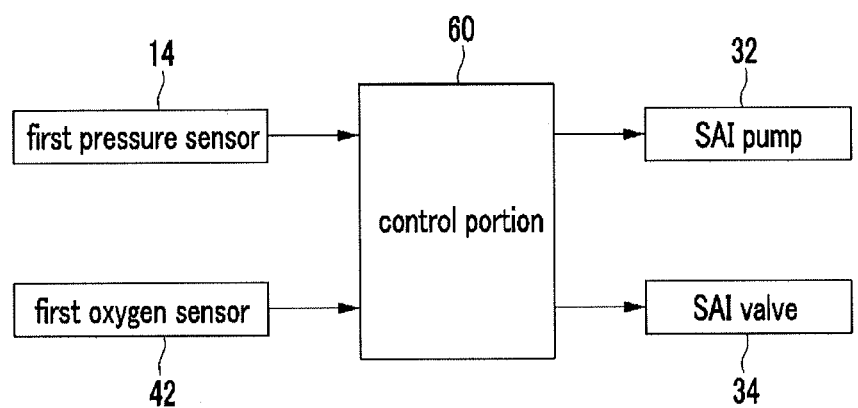
FIG. 2 is a block diagram of a system of diagnosing a secondary air injection apparatus according to an exemplary embodiment of the present invention.

FIG. 2 is a block diagram of a system of diagnosing a secondary air injection apparatus according to an exemplary embodiment of the present invention.

As shown in FIG. 2, a system of diagnosing the secondary air injection apparatus according to an exemplary embodiment of the present invention includes a control portion 60 for diagnosing the secondary air injection apparatus based on the pressure or the amount of the air and the air/fuel ratio of the exhaust line detected respectively by the first pressure sensor 14 and the first oxygen sensor 42.

The control portion 60 is electrically connected to the first pressure sensor 14 and receives a signal corresponding to the pressure of the air flowing through the intake line 10. The control portion 60 calculates the amount of the air flowing through the intake line 10 based on the pressure of the air. Therefore, the modeling value for calculating the amount of the air according to the pressure of the air may be stored in the control portion 60. On the contrary, the control portion 60 may receive a signal corresponding to the amount of the air directly from the first flow meter mounted at the intake line 10.

In addition, the control portion 60 is electrically connected to the first oxygen sensor 42 and receives a signal corresponding to the air/fuel ratio of the exhaust line.

The control portion 60 can be realized by one or more processors activated by a predetermined program, and the predetermined program can be programmed to perform each step of a method of diagnosing a secondary air injection apparatus according to an exemplary embodiment of the present invention. Therefore, the control portion 60 is adapted to control the SAI pump 32 and the SAI valve 34 so as to perform each step of a method of diagnosing the secondary air injection apparatus according to an exemplary embodiment of the present invention.

Hereinafter, the method of diagnosing the secondary air injection apparatus according to an exemplary embodiment of the present invention will be described in detail.

Figure 3:
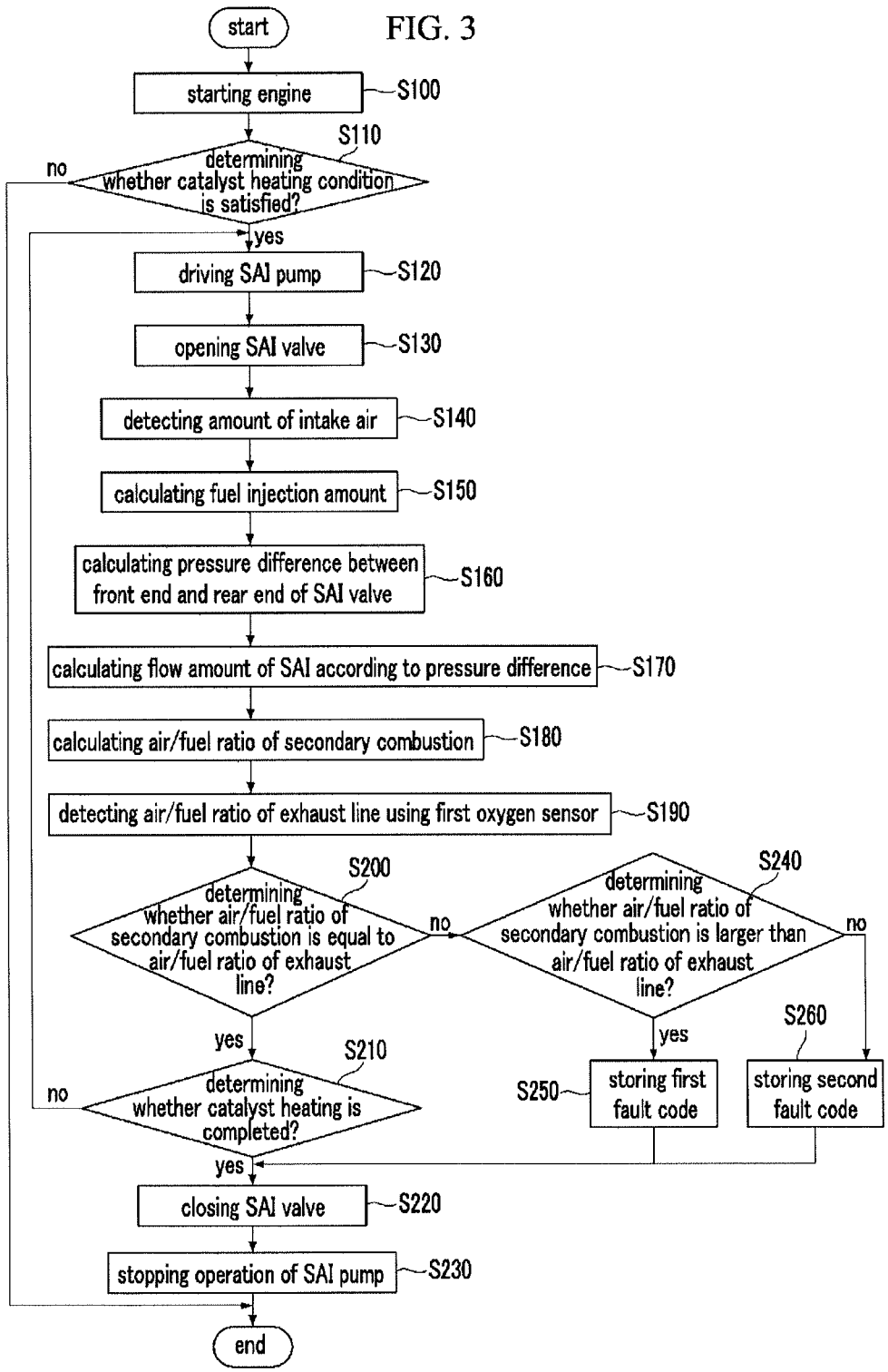
FIG. 3 is a flowchart of a method of diagnosing a secondary air injection apparatus according to an exemplary embodiment of the present invention.

FIG. 3 is a flowchart of a method of diagnosing a secondary air injection apparatus according to an exemplary embodiment of the present invention. An exemplary embodiment of the present invention illustrated in FIG. 3 is a method for diagnosing fault of the SAI apparatus during the SAI is performed.

As shown in FIG. 3, the method of diagnosing the secondary air injection apparatus according to an exemplary embodiment of the present invention begins when the engine 20 is started at step S100.

If the engine 20 is started, the control portion 60 determines whether a catalyst heating condition is satisfied at step S110. Herein, the catalyst heating condition is satisfied when the engine 20 is not started for more than a predetermined time. In addition, the predetermined time may be 8 hours.

If the catalyst heating condition is not satisfied, the control portion 60 finishes the method of diagnosing the fault according to an exemplary embodiment of the present invention.

If the catalyst heating condition is satisfied, the control portion 60 drives the SAI pump 32 at step S120. If the pressure of the SAI line 30 is higher than or equal to a predetermined pressure due to the operation of the SAI pump 32, the control portion 60 opens the SAI valve 34 so as to supply the air to the exhaust line 40 at step S130. In this case, the exhaust gas is burnt again by the air supplied to the exhaust line 40.

At this state, the first pressure sensor 14 detects the pressure of the air flowing through the intake line 10 and transmits the signal corresponding thereto to the control portion 60. In this case, the control portion 60 detects the amount of the intake air based on the modeling value for calculating the amount of the air according to the pressure of the air at step S140.

In addition, the control portion 60 calculates a fuel injection amount according to the amount of the intake air at step S150 and accordingly controls the injector.

As described above, the SAI pump 32 is controlled by the PWM signal. Therefore, the control portion 60 can calculate a rotation speed of the SAI pump 32 according to the PWM signal and can calculate a pressure at a front end of the SAI valve 34 according to the rotation speed of the SAI pump 32. In addition, the control portion 60 calculates a pressure of the exhaust gas (i.e., pressure at a rear end of the SAI valve 34). The pressure of the exhaust gas is decided according to engine load and a map in which the pressure of the exhaust gas according to the engine load is stored is provided in the control portion 60.

Figure 5:
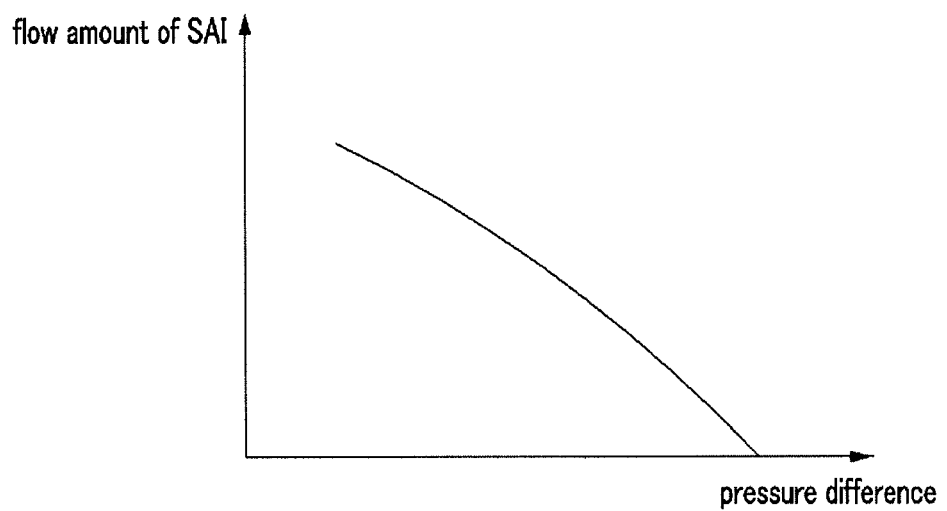
FIG. 5 is a graph showing a flow amount of SAI to a pressure difference between a front end and a rear end of an SAI valve.

After that, the control portion 60 calculates a pressure difference between the front end and the rear end of the SAI valve 34 at step S160 and calculates the flow amount of the SAI according to the pressure difference at step S170. As shown in FIG. 5, modeling value for calculating the flow amount of the SAI according to the pressure difference between the front end and the rear end of the SAI valve 34 is stored in the control portion 60. Therefore, the control portion 60 calculates the flow amount of the SAI using the pressure difference.

After that, the control portion 60 calculates an air/fuel ratio of secondary combustion at step S180. Herein, the air/fuel ratio of the secondary combustion means an air/fuel ratio at a time when the air of the SAI line 30 is supplied to the exhaust line 40 and the exhaust gas is burnt again. The air/fuel ratio of the secondary combustion can be calculated from the following equation.

$$\lambda 1 = (N+M)/F$$

Herein, $\lambda 1$ is the air/fuel ratio of the secondary combustion, N is the amount of the intake air, M is the flow amount of the SAI, and F is the fuel amount.

In addition, the first oxygen sensor 42 detects the air/fuel ratio of the exhaust line at step S190 and transmits the signal corresponding thereto to the control portion 60.

The control portion 60 determines whether the air/fuel ratio of the secondary combustion is equal to the air/fuel ratio of the exhaust line at step S200.

If the air/fuel ratio of the secondary combustion is equal to the air/fuel ratio of the exhaust line, the control portion 60 determines whether catalyst heating is completed at step S210 because fault of the SAI apparatus does not occur. The catalyst heating is determined to be completed if a temperature of the catalytic converter 44 is higher than or equal to a predetermined temperature (e.g., an activation temperature of a catalyst).

If the catalyst heating is not completed, the control portion 60 returns to the step S120 and continues to drive the SAI pump 32.

If the catalyst heating is completed, the control portion 60 closes the SAI valve 34 at step S220 and stops the operation of the SAI pump 32 at step S230.

Meanwhile, if the air/fuel ratio of the secondary combustion is not equal to the air/fuel ratio of the exhaust line at the step S200, the control portion 60 determines whether the air/fuel ratio of the secondary combustion is larger than the air/fuel ratio of the exhaust line at step S240.

If the air/fuel ratio of the secondary combustion is larger than the air/fuel ratio of the exhaust line, the control portion 60 stores a first fault code. If the air/fuel ratio of the secondary combustion is smaller than the air/fuel ratio of the exhaust line, the control portion 60 stores a second fault code. The first fault code is a fault code related to SAI valve stuck or SAI line leak, and the second fault code is a fault code related to an error of the modeling value for calculating the flow amount of the SAI.

After the fault code is stored, the control portion 60 closes the SAI valve 34 at the step S220 and stops the operation of the SAI pump 32.

Hereinafter, a method of diagnosing the secondary air injection apparatus according to another exemplary embodiment of the present invention will be described in detail.

Figure 4:
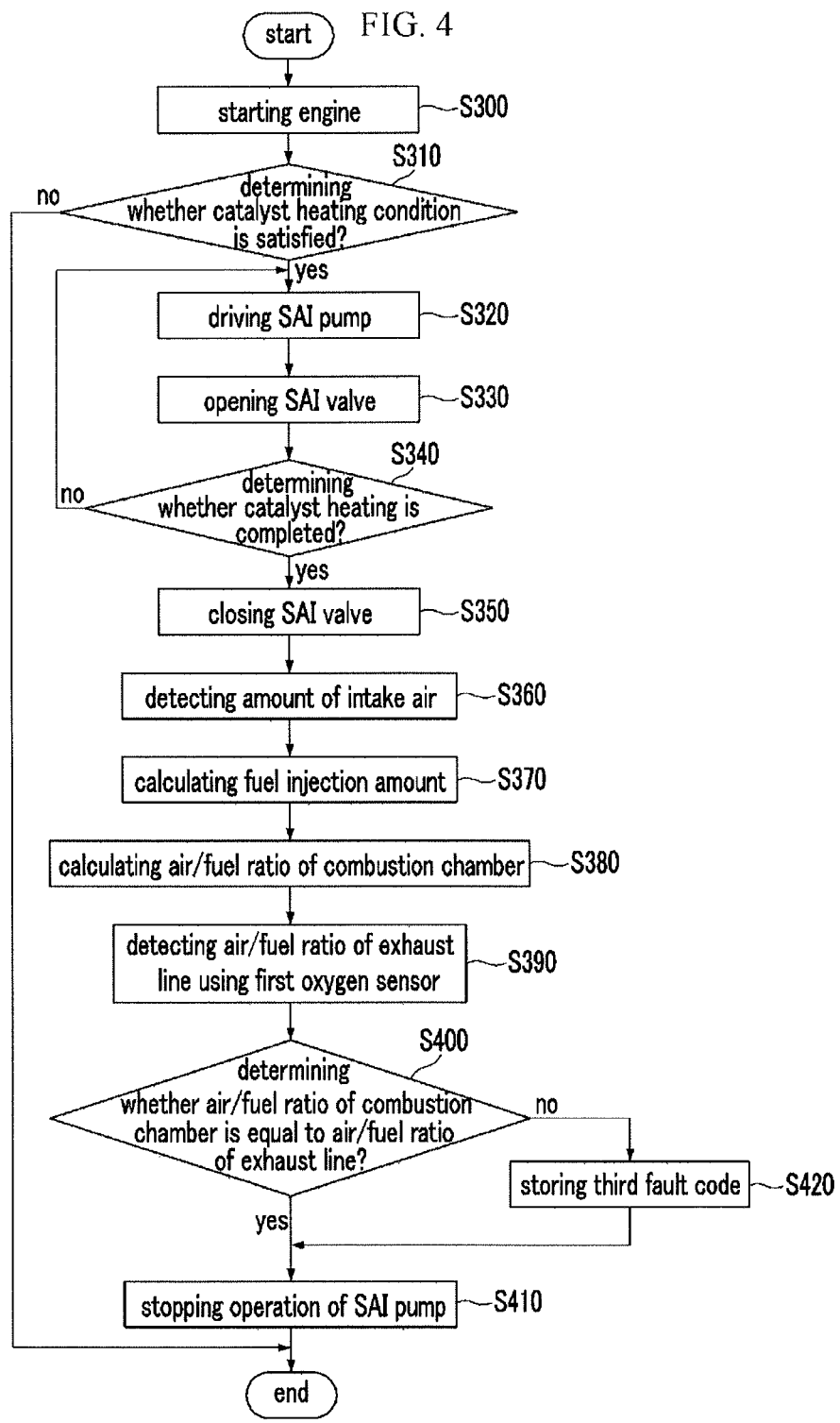
FIG. 4 is a flowchart of a method of diagnosing a secondary air injection apparatus according to another exemplary embodiment of the present invention.

FIG. 4 is a flowchart of a method of diagnosing a secondary air injection apparatus according to another exemplary embodiment of the present invention. Another exemplary embodiment of the present invention illustrated in FIG. 4 is a method for diagnosing fault of the SAI apparatus after the SAI is completed.

As shown in FIG. 4, the method of diagnosing the secondary air injection apparatus according to begins when the engine 20 is started at step S300.

If the engine 20 is started, the control portion 60 determines whether the catalyst heating condition is satisfied at step S310. If the catalyst heating condition is satisfied, the control portion 60 drives the SAI pump 32 at step S320 and opens the SAI valve 34 at step S330 so as to warm up the catalytic converter 44.

After that, the control portion 60 determines whether the catalyst heating is completed at step S340. If the catalyst heating is not completed, the control portion 60 returns to the step S320. If the catalyst heating is completed, the control portion 60 closes the SAI valve 34 at step S350 and detects the amount of the intake air at step S360. In addition, the control portion 60 calculates the fuel injection amount at step S370.

After that, the control portion 60 calculates air/fuel ratio of the combustion chamber at step S380. Herein, the air/fuel ratio of the combustion chamber means air/fuel ratio in the combustion chamber of the engine 20. The air/fuel ratio of the combustion chamber can be calculated from the following equation.

$$\lambda 2 = N/F$$

Herein, λ2 represents the air/fuel ratio of the combustion chamber, N represents the amount of the intake air, and F represents the fuel amount.

In addition, the first oxygen sensor 42 detects the air/fuel ratio of the exhaust line at step S390 and transmits the signal corresponding thereto to the control portion 60.

The control portion 60 determines whether the air/fuel ratio of the combustion chamber is equal to the air/fuel ratio of the exhaust line at step S400. If the SAI valve 34 is closed, the air cannot be directly supplied to the exhaust line 40. Only the air supplied to the combustion chamber can pass the exhaust line. Therefore, if the SAI apparatus is not out of order, the air/fuel ratio of the combustion chamber should be equal to the air/fuel ratio of the exhaust line.

If the air/fuel ratio of the combustion chamber is equal to the air/fuel ratio of the exhaust line, the control portion 60 determines that the SAI is performed normally and stops the operation of the SAI pump 32 at step S410.

If the air/fuel ratio of the combustion chamber is not equal to the air/fuel ratio of the exhaust line, the control portion 60 stores a third fault code at step S420 and stops the operation of the SAI pump 32 at the step S410. The third fault code is fault code related to the SAI valve stuck.

As described above, fault of the SAI apparatus can be diagnosed using sensors mounted to a conventional SAI apparatus according to an exemplary embodiment of the present invention. Therefore, cost may be reduced and a layout of the SAI apparatus may be simplified.

That is, fault of the SAI apparatus can be diagnosed using the sensors already mounted at the vehicle without mounting an additional flow meter at the SAI line according to an exemplary embodiment of the present invention. Therefore, cost may be reduced and a layout of the SAI apparatus may be simplified.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A vehicle having a system of diagnosing a secondary air injection apparatus, comprising:
    an engine generating power by burning an air/fuel mixture;
    an intake line supplying air to the engine;
    an exhaust line exhausting exhaust gas produced at the engine to an exterior of the vehicle;
    a secondary air injection (SAI) line branching off at a branch point of the intake line and being joined to the exhaust line at a joining point of the exhaust line;
    a first pressure sensor mounted at the intake line and detecting pressure or amount of intake air flowing through the intake line;
    a catalytic converter mounted at the exhaust line and removing noxious material contained in the exhaust gas;
    a first oxygen sensor mounted at the exhaust line between the joining point and the catalytic converter and detecting an air/fuel ratio in the exhaust line;
    an SAI pump mounted at the SAI line and pumping the air flowing through the intake line to the SAI line;
    an SAI valve mounted at the SAI line and selectively communicating the SAI line with the exhaust line; and
    a control portion controlling the SAI pump and the SAI valve so as to perform catalyst heating,
    wherein the control portion determines an air/fuel ratio of secondary combustion in a state where secondary air injection (SAI) is executed by driving the SAI pump and opening the SAI valve, determines an air/fuel ratio of a combustion chamber in a state where the SAI valve is closed after the catalyst heating is completed by driving the SAI pump and opening the SAI valve, and determines fault by comparing the air/fuel ratio of the secondary combustion or the air/fuel ratio of the combustion chamber with the air/fuel ratio of the exhaust line detected by the first oxygen sensor.

2. The vehicle of claim 1, wherein the control portion opens the SAI valve when a pressure of the SAI line is higher than or equal to a predetermined pressure.

3. The vehicle of claim 1, wherein the control portion stores a first fault code related to the SAI valve being stuck or an SAI line leak when the air/fuel ratio of the secondary combustion is larger than the air/fuel ratio of the exhaust line.

4. The vehicle of claim 1, wherein the control portion stores a second fault code related to an error of a modeling value for determining a flow amount of the SAI when the air/fuel ratio of the secondary combustion is smaller than the air/fuel ratio of the exhaust line.

5. The vehicle of claim 1, wherein the control portion stores a third fault code related to the SAI valve being stuck when the air/fuel ratio of the combustion chamber is not equal to the air/fuel ratio of the exhaust line.

6. The vehicle of claim 1, wherein the control portion determines the air/fuel ratio of the secondary combustion using the pressure or the amount of the intake air detected by the first pressure sensor and a rotation speed of the SAI pump.

7. The vehicle of claim 6, wherein the control portion determines a pressure difference between a front end and a rear end of the SAI valve using the rotation speed of the SAI pump and an exhaust pressure according to a load.

8. The vehicle of claim 7, wherein a modeling value for determining a flow amount of the SAI according to the pressure difference between the front end and the rear end of the SAI valve is stored in the control portion.

9. The vehicle of claim 1, wherein the control portion determines the air/fuel ratio of the combustion chamber using the pressure or the amount of intake air detected by the first pressure sensor.

10. The vehicle of claim 1, wherein the control portion determines that the catalyst heating is completed when a temperature of the catalytic converter is higher than or equal to a predetermined temperature.

11. A method of diagnosing a secondary air injection apparatus provided with a first pressure sensor mounted at an intake line which supplies air to an engine and detects a pressure or an amount of intake air, a first oxygen sensor mounted at an exhaust line which exhausts exhaust gas generated at the engine and detects an air/fuel ratio of the exhaust line, an SAI line which supplies the air to the exhaust gas of the exhaust line for catalyst heating, and an SAI pump and an SAI valve mounted at the SAI line, the method comprising:

driving the SAI pump when a catalyst heating condition is satisfied;

opening the SAI valve;

determining an air/fuel ratio of secondary combustion;

detecting the air/fuel ratio of the exhaust line using the first oxygen sensor; and determining fault of the secondary air injection apparatus by comparing the air/fuel ratio of the secondary combustion with the air/fuel ratio of the exhaust line.

12. The method of claim 11, wherein the SAI valve is opened when a pressure of the SAI line is higher than or equal to a predetermined pressure.

13. The method of claim 11, wherein the determining of the air/fuel ratio of the secondary combustion includes:

detecting the amount of the intake air;

determining a fuel injection amount;

determining a pressure difference between a front end and a rear end of the SAI valve;

determining a flow amount of SAI according to the pressure difference; and determining the air/fuel ratio of the secondary combustion using the amount of the intake air, the fuel injection amount, and the flow amount of the SAI.

14. The method of claim 11, further including storing a first fault code related to the SAI valve being stuck or an SAI line leak when the air/fuel ratio of the secondary combustion is larger than the air/fuel ratio of the exhaust line.

15. The method of claim 11, further including storing a second fault code related to an error of modeling value for determining the flow amount of the SAI when the air/fuel ratio of the secondary combustion is smaller than the air/fuel ratio of the exhaust line.

16. A method of diagnosing a secondary air injection apparatus provided with a first pressure sensor mounted at an intake line which supplies air to an engine and detects a pressure or an amount of intake air, a first oxygen sensor mounted at an exhaust line which exhausts exhaust gas generated at the engine and detects an air/fuel ratio of the exhaust line, a SAI line which supplies the intake air to the exhaust gas of the exhaust line for catalyst heating, and an SAI pump and an SAI valve mounted at the SAI line, the method comprising:

driving the SAI pump when a catalyst heating condition is satisfied;

opening the SAI valve;

determining whether the catalyst heating is completed;

closing the SAI valve when the catalyst heating is completed;

determining an air/fuel ratio of a combustion chamber in the engine;

detecting the air/fuel ratio of the exhaust line using the first oxygen sensor; and determining fault of the secondary air injection apparatus by comparing the air/fuel ratio of the combustion chamber with the air/fuel ratio of the exhaust line.

17. The method of claim 16, wherein the SAI valve is opened when a pressure of the SAI line is higher than or equal to a predetermined pressure.

18. The method of claim 16, wherein the determining of the air/fuel ratio of the combustion chamber includes:

detecting the amount of the intake air;

determining a fuel injection amount; and determining the air/fuel ratio of the combustion chamber using the amount of the intake air and the fuel injection amount.

19. The method of claim 16, further including storing a third fault code related to the SAI valve being stuck when the air/fuel ratio of the combustion chamber is not equal to the air/fuel ratio of the exhaust line.

20. The method of claim 16, wherein the SAI valve is opened when the pressure of the SAI line is higher than or equal to a predetermined pressure.

\* \* \* \* \*